United States Patent Office 3,795,546
Patented Mar. 5, 1974

3,795,546
RINSING COATED METALLIC SURFACES
Wilbur S. Hall, Plymouth Meeting, and Lester Steinbrecher, Southampton, Pa., assignors to Amchem Products, Inc., Ambler, Pa.
No Drawing. Continuation-in-part of applications Ser. No. 791,762, Jan. 16, 1969, now Patent No. 3,592,699, and Ser. No. 791,801, Jan. 16, 1969, now Patent No. 3,585,084, which is a continuation-in-part of application Ser. No. 554,336, June 1, 1966, now abandoned. This application June 14, 1971, Ser. No. 152,993
The portion of the term of the patent subsequent to July 13, 1988, has been disclaimed
Int. Cl. C23f 7/26
U.S. Cl. 148—6.2                10 Claims

ABSTRACT OF THE DISCLOSURE

A metallic surface is coated with a polymeric resinous coating by immersing the surface in an acidic aqueous coating composition comprising polymeric resinous coating-forming material and an oxidizing agent. The corrosion resistance and/or the surface appearance of the resinous coating is modified by rinsing the coating with an aqueous rinse solution containing hexavalent chromium or an aqueous rinse solution containing hexavalent chromium and reduced forms of chromium.

---

This is a continuation-in-part of applications Ser. No. 791,762, now Pat. No. 3,592,699, and Ser. No. 791,801, now Pat. No. 3,585,084, each filed on Jan. 16, 1969 and each of which is a continuation-in-part of Ser. No. 554,336, filed June 1, 1966, now abandoned.

This invention relates to the rinsing of coated metallic surfaces with aqueous rinse solutions containing chromium.

Hereinafter in this specification, as well as in the claims appended hereto, the term "ferriferous" means iron, steel and alloys of iron; the term "steel" is meant to denote alloys of iron wherein iron is the principal ingredient, such as cold- and hot-rolled steel in which the alloying constituents comprise minor amounts of carbon, silicon, manganese. When utilized herein, the term "zinciferous" means zinc and zinc alloys in which zinc is the principal constituent, as well as galvanized surfaces, including both hot-dipped and electrogalvanized surfaces.

The aforementioned applications, the disclosures of which are incorporated herein by reference, disclose a method and composition for applying coatings to metallic surfaces by immersing or dipping the metallic surface in an acidic aqueous composition comprising an organic coating-forming material and an oxidizing agent. Examples of organic coating-forming materials which can be utilized in the invention described in the aforementioned applications are polymeric resinous film-forming materials such as polyethylene, poly-acrylics, and styrene-butadiene copolymers. The film-forming material can be present in the acidic aqueous coating composition in dissolved, emulsified or dispersed form. Examples of oxidizing agents used in the coating composition are hydrogen peroxide, dichromate, perborate, bromate, permanganate, nitrite, nitrate and chlorate. A preferred coating composition is an acidic aqueous composition comprising fluoride ion, an oxidizing agent selected from the class consisting of hydrogen peroxide and dichromate, and particles of a film-forming resin dispersed in the composition, wherein the fluoride ions are added to the composition in the form of hydrofluoric acid and wherein the pH of the composition is within the range of about 1.6 and to about 3.8.

As will be explained more fully below, the invention described herein includes within its scope the ringing with an aqueous rinse solution containing chromium of polymeric resinous coatings, including coatings of the type formed from the coating compositions described in the aforementioned applications.

Coating compositions described in the aforementioned applications have a number of extremely important unique characteristics. For example, the coating compositions are effective in forming resinous coatings, the weights or thicknesses of which are related to the time the metallic surface is immersed in the composition. The longer the time of immersion, the heavier or thicker the coating. This characteristic is not possessed by known organic coating compositions. For example, it is known that a conventional latex, that is a dispersion of a film-forming polymeric material in water, can be utilized to form organic coatings on metallic surfaces by immersing the surface in a bath of the latex; however, the thickness of the resultant coating is substantially the same regardless of how long the surface is immersed. In essence, the weight or thickness of a coating that can be obtained from a particular latex is limited when the surface is simply immersed therein. In order to build up the thickness of the coating, applicators have subjected metallic surfaces to a multiple stage coating operation in an effort to attain a coating of the desired thickness. Such operation includes immersing the metallic surface in a latex bath, withdrawing the surface, drying or fusing (as by heating) the coating formed thereon and then repeating the immersion and drying steps until the thickness of the coating is satisfactory. This, of course, is a time-consuming and costly operation. Moreover, the resins of some film-forming lactices do not adhere to themselves readily and efforts to build up layer upon layer of the resin have been frustrated or special techniques must be utilized. This further adds to the cost of the multiple stage application process. These disadvantages can be avoided by the use of the compositions described in the aforementioned applications.

Another undesirable characteristic of known organic film-forming compositions is that the coating deposited on the metallic surface is not initially adherent to the surface. For example, the coating cannot be rinsed without removing virtually all of the coating from the surface. This evidences a lack of adherence to the substrate. On the other hand, the coatings formed from the compositions described in the aforementioned applications are initially adherent to the substrate and resist being rinsed therefrom even when they are still wet.

Another shortcoming of utilizing known organic film-forming compositions is that little or no coating is formed on the edges of the metallic article. However, coatings formed from the compositions described in the aforementioned applications adhere to the edges of the article.

Although coatings formed from compositions disclosed in the aforementioned application have relatively good corrosion resistant properties, it has been found that rinsing the coatings with a dilute aqueous rinse solution of hexavalent chromium or with a dilute aqueous rinse solution containing hexavalent chromium and reduced forms of chromium improves the corrosion resistant properties of the coatings. The latter type of rinse solution, that is, $Cr^{+6}$/reduced Cr rinse solution, is disclosed in U.S. Pat. No. 3,063,877. The present invention is directed to rinsing polymeric resinous coatings with the aforementioned Cr rinse solutions to improve the corrosion resistance of the coatings.

Another aspect of this invention relates to the modification of the appearance of the polymeric resinous coatings. By way of background, it is noted that coatings formed from compositions disclosed in the aforementioned applications can have a very glossy surface. For some applications this is of no consequence or may even be desired. However, for other applications, the glossy surface of the coating may be undesirable. For example, when the polymeric resinous coating is used as a final finish for certain types of articles, (e.g. brackets, latches, and vehicle underhood parts), it has been observed that the articles tend to have a more attractive or aesthetically appealing appearance if the coating is matted. The coatings can be made to appear mated or dulled by heating at temperatures above those that would be used normally to dry or fuse the coating, but this has the disadvantage that the corrosion resistance of the coating can be affected adversely. This invention includes within its scope the treatment of glossy resinous coatings of the type produced by the coating compositions described in the aforementioned applications with chromium rinse solutions of the type mentioned above to reduce gloss and produce a matted, dulled or lusterless surface.

As mentioned hereinabove, coatings which are rinsed according to the present invention can be formed from an acidic aqueous coating composition containing a film-forming polymeric resinous material and an oxidizing agent. The resinous material can be present in the composition either in dissolved form, emulsified form, or in the form of insoluble particles dispersed in the composition. Examples of water soluble resinous materials are polyacrylic acid and ethylene maleic anhydride (Monsanto DX–840–12). Aqueous solutions of polyacrylic acids are available commercially, for example those sold under the name Acrysol A-1 and Acrysol A-3. It is preferred to utilize an aqueous composition which has particles of resin dispersed in it.

In formulating a coating composition that has particles of resin dispersed in it, it is preferred that the other ingredients of the composition be added to a latex, that is a dispersion of insoluble resin particles in water. Latices, which are the source of the dispersed resin particles, are readily available and those sold commercially can of course be utilized. Examples of commercially available latices are Pliolite 491, a styrene-butadiene latex; and Poly-em 40, a polyethylene latex. In addition to having dispersed therein resin solids, latices usually contain other ingredients including, for example, emulsifiers and protective colloids. The other ingredients used in the composition of this invention are preferably added to the latices in solution form. Upon addition of the other ingredients to a latex, there is obtained a composition which can be characterized as an acidic aqueous solution of an oxidizing agent having dispersed therein solid resin particles.

It is noted that coatings can be produced also from coating compositions in which the film-forming material is not polymeric in nature. Examples of such film-forming materials are fatty acids such as, for example, stearic acid.

The amount of organic film-forming material utilized in the acidic aqueous composition can vary over a wide range. The lower concentration limit is dictated by the amount of coating material needed to provide sufficient material to form a coating. The upper limit is dictated by the amount of material which can be dissolved, emulsified, or dispersed in the acidic aqueous composition.

The coating composition is acidic and thus contains acid. Any acid, present in an amount sufficient to impart a pH of less than 7 to the composition, can be used. For example, the acid can be a mineral or an organic acid. Typical examples of mineral acids that can be used are sulphuric, hydrochloric, hydrofluoric, nitric, phosphoric, hydrobromic and hydroiodic. Examples of organic acids that can be used are acetic, chloracetic, trichloracetic, lactic, tartaric and polyacrylic acid. Examples of other acids that can be used are fluoboric, fluotitanic and fluosilicic. Hydrofluoric acid is a preferred acid.

With respect to the use of an acid such as for example polyacrylic acid, a resinous material of this nature which is soluble in the composition can be the source of not only the coating-forming ingredient, but also the source of the necessary hydrogen ions. By way of example, it is noted that polyacrylic resinous coatings had been applied to steel panels from an aqueous solution of polyacrylic acid and hydrogen peroxide.

It is noted also that an acid which contains an anion that functions as an oxidizing agent can be the source of not only hydrogen ion, but also the oxidizing agent. An example of such an acid is nitric acid.

It is preferred that the aqueous coating composition have a pH within the range of about 1.6 to about 3.8. Thus, the preferred amounts of acids are those which impart to the composition a pH within the preferred range.

The acid component dissociates, of course, to yield hydrogen ion and an anion. If it is desired to have a particular anion present in a composition such as, for example, fluoride ion, which gives particularly good results, and it is desired also to use an acid other than one which contains the particular anion, then the anion can be added by way of a soluble salt containing the anion.

Any oxidizing agent can be utilized in the coating composition. Examples of oxidizing agents that can be used are hydrogen peroxide, dichromate, perborate, bromate, permanganate, nitrite, nitrate, and chlorate. Oxidizing agents can be conveniently added to the composition in the form of its water soluble salt, such as for example alkali and ammonium salts. Particularly good results have been obtained when the oxidizing agent is one which releases oxygen in the acidic aqueous coating composition. The preferred oxidizing agents are hydrogen peroxide and dichromate, with hydrogen peroxide being most preferred. Hydrogen peroxide can be added conveniently to the composition in the form of a 30% aqueous solution. As to the source of dichromate, excellent results have been obtained by utilizing a dichromate salt, for example, calcium dichromate. However, any water soluble hexavalent chromium-containing compound, which forms dichromate in an aqueous acidic medium can be used. For example, chromates and chromic acid can be used as the source of dichromate.

The amount of oxidizing agent that should be used is an amount sufficient to provide an oxidizing equivalent of at least 0.01 per liter of the composition. (The term "oxidizing equivalent" when used herein means the number of grams of oxidizing agent used divided by the equivalent weight of the oxidizing agent. The equivalent weight of the oxidizing agent is the gram molecular weight of the agent divided by the change in valence of all atoms in the molecule which change valence (usually one element).) Amounts of oxidizing agents which provide an oxidizing equivalent somewhat below 0.01 can be used but preferably the oxidizing equivalent should be at least within the range of about 0.01. It appears that there is no critical upper limit as to the oxidizing equivalents that are used; however, it is preferred that the oxidizing agent be present in an amount such that the upper oxidizing equivalent value is about 0.2. However, it should be understood that the oxidizing agent can be used in an amount to provide an oxidizing equivalent much higher than 0.2, for example, one or more.

There appears hereinafter a description of a preferred coating composition which can be used to form coatings which are rinsed in accordance with this invention. The preferred composition is one which contains a dispersed resin as the coating-forming ingredient, the source of the resin being a latex thereof, in combination with fluoride ion and either hydrogen peroxide or dichromate as the oxidizing agent. More particularly the preferred aqueous acidic coating composition comprises:

(a) About 5 gs./l. to about 550 gs./l. of resin solids dispersed in the composition, the source of the resin being a latex thereof;

(b) About 0.4 g./l. to about 5 gs./l. of fluoride ion;

(c) An oxidizing agent selected from the class consisting of $H_2O_2$ and dichromate, said agent being present in an amount sufficient to provide from about 0.01 to about 0.2 of oxidizing equivalent per liter of composition; and (d) Hydrogen ion in an amount sufficient to impart a pH to the composition of about 1.6 to about 3.8.

As will be apparent from the discussion which follows, coating compositions can be formulated with above mentioned ingredients present in amounts outside of the ranges set forth above—the above described composition being a preferred one.

With respect to the resin component of the above described preferred composition, it is present in the composition in the form of dispersed particles. This aqueous resin dispersion is preferably supplied as a latex.[1] The latex should be stable, of course, in the presence of the other ingredients comprising the composition. The manifestation of an unstable latex or one which cannot be stabilized in the dispersed resin will precipitate, flocculate or gel.

Examples of commercially available latices which can be used include the following:

| Trade name: | Reported composition |
| --- | --- |
| Pliolite 491 | Styrene-butadiene. |
| Acrylene 45 | Acrylic co-polymer. |
| Catalin A-1464 | Acrylic co-polymer. |
| Catalin A-1482 | Acrylic co-polymer. |
| Geon 552 | Polyvinyl chloride. |
| Hycar 2600X 91 | Acrylic co-polymer. |
| Hycar 2600X 92 | Acrylic co-polymer. |
| Catalin A-1422 | Acrylic co-polymer. |
| Rhoplex HA-12 | Acrylic co-polymer. |
| Poly-Em 40 | Polyethylene. |
| Pliovic 400 | Acrylic co-polymer. |
| Teflon | Tetrafluoroethylene. |

Coating-forming latices other than those listed above, may be employed. However, the group of latices listed above has been found to give very satisfactory and acceptable results, and for this reason may be regarded as the preferred set of latex resin materials for use in the invention.

The amount of dispersed resin utilized in the coating composition can vary over a wide range. The lower concentration limit of the resin is dictated by the amount of resin needed to provide sufficient resinous material to form a coating. The upper limit is dictated by the amount of resin which can be dispersed in the acidic aqueous solution. Although higher or lower amounts can be used, it is preferred that the composition contain from about 5 to about 550 gs./l. of resin. The volume of latex utilized to provide the desired amount of resin will vary depending on the amount of resin solids dispersed in the latex, as latices varying in solids content are of course available.

The concentration of the resin in the composition has an influence on the weight of coating that will be obtained, other factors held constant. Compositions with greater amounts of a particular resin will produce higher coating weights. For example in one series of experiments panels were immersed for one minute in a composition that contained 1.5 gs./l. of hydrogen peroxide, 2 gs./l. of fluoride ion (added as HF) and different amounts of acrylic resin, the source of which was Catalin A-1316 latex. When the acrylic resin content was about 12 gs./l. a coating weight of 232.2 mgs./sq. ft. was obtained, whereas when the composition contained in the range of about 250 gs./l. of acrylic resin, the weight of the coating was almost 1550 mgs./sq. ft.

As mentioned above, the preferred aqueous acidic coating composition for use in this invention contains fluoride ion. The optimum, preferred method of making the composition acidic and adding fluoride ion comprises the use of hydrofluoric acid. This acid permits a simple means for control over pH requirements of the composition and obviates the need for introducing the fluoride ion in the form of an alkali metal, ammonium or other salt. While coatings can be obtained by adding the fluoride in salt form, it is preferred to utilize hydrofluoric acid and avoid the use of salts which may give rise to undesirable cations in the coating composition or complicate pH adjustment. If the fluoride component is added in the form of a salt, the pH of the composition can be adjusted by the use of acids other than hyrofluoric or in combination with hydrofluoric. Examples of such acids include sulfuric, phosphoric, nitric and hydrochloric.

With respect to the fluoride ion concentration, amounts within the range of about 0.4 to about 5 gs./l. of composition (calculated as F) are preferred. Nevertheless, higher or lower amounts can be utilized to provide coatings wherein the coating weight builds up as a function of time.

As noted hereinabove, the preferred pH value of the acidic coating composition is within the range of about 1.6 to about 3.8. This pH may be measured by any conventional means, the standard glass electrode method being conventional practice. However, due to the presence of fluoride ion in the coating solution, the pH value should be determined by rapidly observing the value obtained on initial immersion of the glass electrodes. Where the pH is permitted to fall below 1.6, the coating composition may tend to etch the metal surface. On the other hand, when the pH of the coating composition rises above about 3.8, the composition tends to impart very thin coatings to the metal substrate.

The oxidizing agent used in the preferred coating composition is hydrogen peroxide or dichromate ion ($Cr_2O_7$). Hydrogen peroxide is most preferred. The hydrogen peroxide can be added conveniently in the form of a 30% aqueous solution of hydrogen peroxide.

The dichromate constituent can be added in the form of a variety of water soluble hexavalent chromium-containing compounds. Examples of such compounds include chromic acid, potassium dichromate, magnesium dichromate, potassium chromate and sodium chromate. Any water soluble hexavalent chromium-containing compound, which in an aqeous acidic medium forms dichromate can be used. Preferred sources of the dichromate ingredient are dichromates, for example calcium dichromate. Particularly good results have been obtained by utilizing an aqueous solution of chromic acid and a calcium salt, for example calcium carbonate. In addition, particularly good results have been obtained by adding to the composition an aqueous solution made up from potassium dichromate and calcium acetate. It is preferred also that the source of dichromate be added to the latex used in the form of an aqeuous solution of the hexavalent chromium-containing compound.

The preferred amount of oxidizing agent is an amount sufficient to provide a oxidizing equivalent of about 0.01 to about 0.2 in one liter of the composition. Somewhat lesser amounts of the oxidizing agent which provide an oxidizing equivalent outside of the lower value can be utilized also. The upper equivalent value is not critical and can be much higher. For example, resinous coatings have been obtained when the amount of hydrogen peroxide used provided an oxidizing equivalent in excess of one. It has been observed that when dichromate is utilized as the oxidizing agent in amounts to provide oxidizing equivalents in the higher range, then higher amounts of fluoride should be used—for example 3½ to 5 gs., when the dichromate equivalent is within the range of about 0.1 to about 0.2.

As to particularly preferred amounts of the oxidizing agent, there should be utilized about 0.3 to about 3.0 g./l. of hydrogen peroxide (approximately 0.02 to 0.2 equivalent) and from about 1 g./l. to about 2 g./l. of dichromate (approximately 0.03 to 0.055 equivalent). However, when an aqueous solution made up from chromic acid and calcium carbonate or when an aqueous solution

---

[1] An authoritative discussion concerning latex resins may be found in Emulsion and Water Soluble Paints and Coatings by Charles R. Martens, published by Reinhold Publishing Corporation, 1964.

made up from potassium dichromate and calcium acetate is used, then lower amounts of dichromate can be utilized and thicker coatings can be obtained, for example about 0.735 g./l. to about 0.95 g./l. of dichromate (approximately 0.02 to 0.03 equivalent).

The above described preferred composition can be utilized to good advantage to produce quality coatings, the thickness of which can be controlled by the time a metallic surface is immersed therein.

Other optional ingredients can be added to the coating compositions described above.

The addtion of a coalescing agent can enhance the corrosion resistant properties of the coatings. Among the many coalescing agents which are available, it is preferred that ethylene glycol monobutyl ether, commonly known as butyl Cellosolve, be used. This particular agent demonstrates complete compatibility in various proportions in the coating composition of this invention, and imparts a high degree of adhesion with respect to bonding polymeric films. Examples of other coalescing agents that can be used are hexylene glycol, diethylene glycol monoethyl ether acetate, diethylene glycol monobutyl ether acetate and ethylene glycol monobutyl ether acetate.

With respect to the amount of coalescing agent used, it is preferred that from about 5 to about 30 grams (per liter of composition) of this agent be employed to realize the enhanced corrosion resistant and adhesion properties; nevertheless, higher or lower amounts can be utilized.

As an aid in assuring thorough wetting of the metallic surface during treatment, it is sometimes preferable to incorporate into the coating composition a small quantity of a wetting agent, such as up to about 0.15% by weight of the total composition, over and above that which may be present in the source of the coating-forming material, for example a latex. Use of wetting agents is preferred practice where the metallic surface to be treated is not thoroughly cleaned, since such agents permit wetting of the metallic substrate with removal of some or all of the contaminants present thereon. Preferably, nonionic or anionic type wetting agents are used; they provide satisfactory degrees of wetting when incorporated into the coating composition of this invention. Examples of wetting agents that can be utilized are alkyl phenoxy polyethoxy ethanol and sodium salts of alkylaryl polyether sulfonate.

If desired, the coating composition used in the present invention may be formulated so as to provide decorative or aesthetic effects upon treated metallic surfaces. When applied to metallic surfaces, the colors of the coatings produced tend to vary depending on a number of factors, including for example, the conditions under which the coatings are dried or fused and the coating-forming material used. Variations in the color may be realized by adding to the composition commonly used water-dispersible pigments, such as for example, phthalocyanine blue, phthalocyanine green, carbon black or quinacridone red. Generally, these pigments provide excellent color variations with no sacrifice in coating quality. Any pigment that is compatible with the composition and does not make it unstable can be used.

The amount of pigment which may be employed will depend, as is well known in the art, upon the depth or degree of hue desired. It should be noted that when dispersible pigments are used, it is advantageous to employ a small quantity of a wetting agent, in accordance with the above discussion, to aid in dispersing the pigment and maintaining it in satisfactory dispersion.

It has been found that the coating composition dissolves metal ions from the metallic surface when it is immersed therein. In order to inhibit or deter the presence of excessive amounts of these ions in the composition, a chelating agent can be used.

The coating composition for use in the practice of this invention can be utilized to coat a variety of metallic surfaces. Particularly good results have been obtained in the coating of ferriferous and zinciferous surfaces.

Metallic surfaces which have thereon a previously formed coating also can be coated by the coating compositions described above. Such previously formed coatings may be of the crystalline or amorphous types. Process and compositions for applying such coatings are well known. By way of example, such coatings can include those that are generally referred to as phosphates, chromates, oxalates, and oxides (anodized or chemically converted) coatings.

There follows a description of conditions under which a coating may be applied in the practice of this invention.

The time of immersion of a metallic surface in the coating composition may vary from as little as 30 seconds to as much as 10 minutes or even longer. However, it has been found that while coating weights increase with prolonged treating times, maximum coating weights seem to be realized within about 10 minutes time, so that longer exposure of the metal surfaces to the action of the coating compositions generally do not yield correspondingly heavier coating weights. This matter of coating weights is also dependent to some extent upon the type of coating-forming material employed, so that in any particular instance preliminary coating weight determinations may be run in order to ascertain the type of coatings which are likely to be obtained with a particular system. In the interest of economy, suffice it to say that it is preferred to operate utilizing coating cycles of from about 1 to about 3 minutes duration.

As was pointed out above, the coating weight, for a particular coating composition and type of metal surface being treated, tends to increase, up to a maximum, as the time of treatment is increased. Once the operating characteristics of a particular coating system have been ascertained, this fact can be exploited to provide a convenient, readily variable, control parameter for securing the desired coating weight. If a light coating is desired, a short treating time can be employed, and when a heavy coating is desired, the treating time can be lengthened. This advantage is unavailable to those using other types of resinous coating compositions because the coating weights obtained with other types of compositions are not, as a practical matter, a function of time.

With respect to coating bath temperature, this is preferably operated anywhere from ambient temperature, that is from about 20° C., up to about 40° C. If the coating bath temperatures are permitted to rise much in excess of about 40° C. it has been found that coating weights begin to decrease, so that if heavier coatings are desired they will not be obtained by raising the temperature— other factors held constant. Nevertheless, coatings can be produced when the temperature of the composition is in excess of about 40° C. Obviously, temperatures which render the composition unstable should be avoided. Since the coatings obtained at ambient temperature are completely satisfactory, it is preferred to operate at this temperature so as to obviate the necessity of maintaining heated bath compositions, and thus obtain a reduction in coating costs. Of greater importance, however, is bath stability, which is at its maximum at room temperature. It has been noted that with respect to latices, these are more stable at room temperatures.

Nevertheless, some advantages can be obtained by immersing the metallic surface in a heated coating composition. With all factors held constant except the temperature of the coating bath, it has been found that higher weight coatings can be obtained as the temperature of the composition is raised. The coating weight begins to fall off as the temperature exceeds a certain limit, which limit will vary depending on the type of coating-forming material utilized in formulating the coating composition.

It is preferred that relative motion be maintained between the coating composition and the metallic surface immersed therein. This may be accomplished, for example, by stirring the composition with a mixer or by moving the surface in the composition. By maintaining relative motion between the surface and the composition, heavier or thicker coatings can be obtained. By way of example, it is noted that in one experiment wherein a metallic surface was moved in the composition, there was obtained a coating that weighed almost ten times as much as a coating formed on a surface that was simply immersed in the composition with no relative motion between it and the composition being maintained.

Coatings can be formed from the composition without utilizing electricity as is used in the electrocoat or electrodeposit process for painting metals. The metallic surface may have an electrical charge as a result of being immersed in the coating composition, but a charge applied from an external source is not needed.

After withdrawing the coated metallic surface from the acidic aqueous coating composition, it is preferred that the coating be rinsed with water to remove loose material that is dragged out of the coating bath.

The coatings can then be rinsed according to the present invention.

$Cr^{+6}$/reduced Cr rinse solutions for use in the practice of this invention are described in U.S. Pat. No. 3,063,877. The rinse solution can be prepared from an aqueous concentrate that is made by treating an aqueous solution of hexavalent chromium, for example an aqueous solution of chromic acid, with formaldehyde to reduce a portion of the hexavalent chromium, for example at least about 5 wt. percent. The upper limit on the amount of total chromium present in reduced form is about 60 wt. percent. Experience has indicated that not much more than this amount of $Cr^{+6}$ can be reduced under the reaction conditions, notwithstanding the addition of large excesses of formaldehyde and/or the elevated temperatures during or following the addition of the formaldehyde. About 50 to about 800 g./l. of $Cr^{+6}$ expressed as $CrO_3$ can be treated with formaldehyde.

About 0.03 mol of formaldehyde (calculated as HCHO) for each mol of $Cr^{+6}$ (calculated as $CrO_3$) should be used to reduce at least the minimum amount of chromium. However, it should be understood that somewhat lower amounts of formaldehyde can be used. For exemplary purposes, it is noted that a 33 wt. percent of $CrO_3$ solution reacted with formaldehyde at a formaldehyde/chromic acid mol ratio of 0.03 to 1 produces a solution with about 5% of chromium in reduced form. As an illustration of reaction ratios yielding a higher percentage of reduced chromium, a solution of about 20% of chromium in reduced form can be obtained, by reacting a 33 wt. percent $CrO_3$ solution with formaldehyde utilizing a formaldehyde/chromic acid mol ratio of 0.1 to 1. The use of a low formaldehyde/chromic acid ratio yields lower total reduced chromium. In addition, decreasing the concentration of the chromic acid solution results in lower reduced chromium values. Conversely, the amount of chromium obtained in the reduced state may be increased by utilizing more concentrated chromic acid solutions or a higher formaldehyde/chromic acid ratio.

In view of the limitations on the maximum amount of chromium which can be reduced, it is not necessary, in general, to use more than about 1 mole of formaldehyde for each mole of $Cr^{+6}$. If higher mole ratios are used, the resulting product may tend to gel on standing. This gel causes no apparent harm and may be broken by vigorous stirring. The tendency toward gel formation may be substantially eliminated by the addition of small amounts of phosphoric acid either before or after the concentrate is diluted. As little as 0.05 ml. of 75% $H_3PO_4$ solution per gram of total chromium (both $Cr^{+6}$ and reduced) is sufficient to prevent such gelling.

Since the reaction of formaldehyde with $CrO_3$ is exothermic, it is generally preferred to add aqueous formaldehyde solution to the chromic acid. This permits close control of the temperature which should not exceed about 180° F. preferably.

The $Cr^{+6}$ only solutions, which are well known, can be prepared conventially from $CrO_3$ and water soluble chromate and dichromate salts according to the conventional manner. Examples of salts that can be used are sodium dichromate, potassium dichromate, sodium chromate and potassium or lithium chromate. These materials can be dissolved in water in amounts appropriate to give the desired concentrations.

The chromium rinse solutions can contain other ingredients. For example, water soluble or water dispersible polyacrylic acids can be added to the $Cr^{+6}$/reduced Cr solutions; such compositions are disclosed in U.S. Pat. No. 3,185,596. The concentration of the polyacrylic acid can be about 2.5 g./l. to about 50 g./l. Higher amounts can be used, but little or no additional improvements are attained, and thus, the use of higher amounts are not justified economically. The polyacrylic acids function to further improve corrosion resistance and paint bonding characteristics of the resinous coatings.

The chromium concentrations of the aqueous rinse solutions containing hexavalent chromium and those containing $Cr^{+6}$ reduced chromium can vary and effects that are obtained will tend to vary depending on the total chromium present in the rinse solution and the $Cr^{+6}$/reduced chromium molar ratio.

Speaking generally, the mere presence of chromium in a rinse solution either as $Cr^{+6}$ only or $Cr^{+6}$/reduced chromium will be effective in improving the corrosion resistance of the resinous coatings. However, to realize significant improvements, the chromium concentration should be at least about .1 g./l. and preferably at least about 0.25 g./l.

For applications in which it is desired to not only improve corrosion resitsance of the resinous coated panels, but also dull the gloss of the resinous coating the following guidelines are set forth with respect to the concentrations of chromium to be used in the aqueous rinse solution. Speaking generally, the concentration of total chromium in a $Cr^{+6}$/reduced chromium solution should be at least about 4 g./l., except as noted below. In such solutions the $Cr^{+6}$/reduced chromium molar concentration can vary over a wide range, for example about 0.6 to about 20 or higher. It has been observed that when the molar ratio of $Cr^{+6}$/reduced Cr is in the range of about 1, that is when, the $Cr^{+6}$/reduced chromium concentrations are about equal, the dulling of the glossy surface can be achieved wtih a rinse soltuion that contains a total chromium concentration of about 0.5 g./l. or higher. An advantage of utilizing such rinse solutions, that is those that contain a $Cr^{+6}$/reduced Cr molar ratio of about 1, as opposed to those in which said ratio is higher or lower is that smaller concentrations of chromium can be used to achieve dulling.

When utilizing a $Cr^{+6}$ only rinse solution, the glossy surface of the resinous coated panels can be dulled or given a matted appearance with a $Cr^{+6}$ concentration of at least about 3 g./l.

The upper concentration limit of the total chromium present in the $Cr^{+6}$ only and $Cr^{+6}$/reduced Cr rinse solution will generally be dictated by economic considerations in that incremental increases in the Cr concentrations do not produce corresponding improvements in the coatings. Although the Cr can be present in amounts approaching its solubility limit, there generally will be little advantage to using solutions that contain more than about 10 grams of Cr per liter.

Other factors that have a bearing on the results that are obtained include time of immersion of the resinous coated panels in the rinse solution, the temperature of the rinse solution and the pH of the rinse solution.

Although the rinse solutions can be applied to the coated surface by other means, it is believed that the most convenient applications will be spraying or immersing the resinous coated surface in a bath of the rinse solution. It has been found that as the contact time between the resinous coated surface and the rinse solution is increased, corrosion resistance and/or dulling can be improved. Time of immersion of a coated panel in the rinse solution is not critical and can vary over a wide range, for example about 10 seconds to about 30 minutes. An immersion time of 30 seconds has been used quite satisfactorily.

The temperature of the rinse solution can vary over a wide range, for example room temperature to about 175° F. Corrosion resistance and/or dulling can be improved as the temperature of the aqueous rinse solution is increased. However, for most applications it is believed that it will be most practical to operate the rinse bath at room temperature. Nevertheless, elevated temperatures can be used to achieve better corrosion resistsance and/or a more pronounced matted appearance.

The aqueous Cr rinse solutions should be acidic and the pH thereof can vary over a wide range. However, to achieve significant dulling and/or corrosion resistance, it is preferred that the pH of the solution be less than about 3.30.

After the coating has been rinsed, it should be dried by allowing water to evaporate. The fusion of a polymeric resinous coating serves to render the coating continuous, thereby improving its resistance to corrosion and adherence to the underlying metal surface.

The conditions under which the drying operation is carried out depend somewhat upon the type of resin employed. Fusion characteristics of coatings formed from the various types of resins which can be utilized in practicing the invention are known and the drying conditions best utilized for a coating formed from a specific resin can be selected on the basis of previous experience. Some of the resins which are suitable for use in the invention do not require high temperatures for fusion, and for these resins air drying at ambient temperatures can be used. Drying can be accelerated by placing the coated surface in a heated environment. Most of the resinous coatings require heated drying stages, or baking, in order to fuse the resin and to insure that the desired corrosion resistance is obtained. In summary, while the drying operation can be performed at room temperature under some circumstances, it is generally preferred that it be done by oven drying or baking.

When a heated environment is used, the drying or fusion stage may be carried out at temperatures about 110° C., and preferably from 120 to 150° C. However, it is to be understood that whatever temperature is ultimately employed will depend, at least in part, on the particular resin utilized. For example, coatings formed from a polyethylene latex are satisfactorily fused within a temperature range of from 110° C. to about 140° C.; tetrafluoroethylene coatings require appreciably higher temperatures. Since the resinous materials are organic, they will tend to degrade if extremely high drying temperatures are employed, and it is, of course, preferred that such temperatures be avoided. This factor presents no difficulty in the operation of the invention, since adequate drying or fusion without degradation is easily obtainable by operation within the temperature ranges set out above.

Drying temperature is also partially dependent upon the time cycles employed. Where relatively short drying cycles are used, i.e., from 30 seconds to two or three minutes, higher oven temperatures are needed. If the drying cycle is of appreciably longer duration, such as for example 10 to 15 minutes, then generally lower temperatures can be utilized. Suffice it to say, the choice of drying conditions will be dictated by considerations of the type of coating formed and drying cycles contemplated.

It has been observed that metallic surfaces coated with the coating composition used in the practice of this invention have formed thereon an organic-inorganic coating, with the inorganic coating being sandwiched between the surface of the metal and the organic coating. The organic coating comprises the coating-forming material used in the coating composition. The nature of the inorganic coating has been difficult to characterize; however, when coating ferriferous surfaces, there has been found some evidence which would indicate that the inorganic coating is an oxide of the metal being coated, for example iron oxide. Thus, as inorganic coating and an organic coating are applied simultaneously to the metal substrate. Whatever the exact nature of the coatings, it is apparent that their corrosion resistant and adherent properties can be vastly superior to coatings produced by previous methods and that these properties can be further improved in accordance with this invention.

EXAMPLES

Examples which follow are illustrative of the invention; examples which are not within the scope of the invention are included for comparative purposes.

Cold rolled steel panels, 4" x 12", were cleaned with an alkaline cleaner, rinsed with water, and immersed for 5 minutes in an aqueous coating composition containing: 100 g./l. of styrene-butadiene copolymer (Pliolite 491 latex sold by Goodyear Tire and Rubber Co.); 2.1 g./l. of HF; 2.3 g./l. of $H_2O_2$; and 5 g./l. of carbon black pigment. Upon being withdrawn from the coating composition, it was observed that resinous coatings were formed on the panels. The coatings were adherent and had thicknesses of about 1 mil. The adherent resinous coatings were rinsed with running tap water and either rinsed with an aqueous Cr rinse solution or not rinsed as indicated in the examples. Thereafter, the resinous coated panels were placed in an oven having a temperature of 220° C. and baked for 10 minutes. After being withdrawn from the oven, the appearances of the resinous coatings were observed and the panels were subjected to a salt spray test (ASTM B–117), as indicated, for the purpose of evaluating the corrosion resistance of the coatings. The results of the salt spray tests are reported as the distance of coating failure measured from the scribe. In those examples in which the failure was not uniform, the maximum and minimum distances of failure are given.

Each of the $Cr^{+6}$/ reduced Cr rinse solutions that were used in the examples was prepared according to the method described in U.S. Pat. No. 3,063,877 referred to hereinabove. Generally speaking, this involved the preparation of a $Cr^{+6}$/reduced Cr aqueous concentrate by reacting appropriate amounts of formaldehyde and $CrO_3$ in aqueous solution at elevated temperature to give the desired $Cr^{+6}$/reduced Cr molar ratio and then diluting the aqueous concentrate with additional water to give the desired rinse solution. It is noted that the concentrates in which the $Cr^{+6}$/reduced Cr molar ratios were 1 and 0.8 contained also 3 wt. percent of 75 wt. percent $H_3PO_4$ to prevent gelling of the concentrate.

The first group of examples shows the results that are obtained when aqueous Cr rinse solutions containing varying amounts of total Cr are used in the practice of the present invention. Each of the rinse solutions had a molar ratio of $Cr^{+6}$/reduced Cr of 1, but the total Cr content of the rinse solutions was varied as indicated in Table 1 below. The resinous coated panels were immersed in the rinse solutions, which were maintained at a temperature of about 25° C., for 30 seconds. After the rinsed coatings were baked as indicated hereinabove, they were subjected to the salt spray test for 144 hrs. The test results and the appearances of the coatings are set forth in Table 1 below. Example No. 1, in which the resinous coating was not rinsed with a Cr rinse solution, is set forth for comparative purposes.

TABLE 1

| Example number: | Conc. of total Cr, g./l. | Scribe failure, inch | Appearance of coating |
|---|---|---|---|
| 1 | (1) | 5/16–5/32 | Glossy, textured. |
| 2 | 0.52 | 3/16–5/32 | Very slightly matted. |
| 3 | 1.09 | 1/8 | Slightly matted. |
| 4 | 2.18 | 3/32–0 | More matted than Ex. 3. |
| 5 | 4.37 | 0 | More matted than Ex. 4. |
| 6 | 8.84 | 0 | More matted than Ex. 5. |

[1] Not rinsed.

The next group of examples shows the results that were obtained with respect to corrosion resistance and surface appearance of resinous coated panels when the panels were immersed in an aqueous Cr rinse solution for various periods of time. The total chromium concentration in the rinse solution was 0.52 g./l. and the $Cr^{+6}$/reduced Cr molar ratio was 1.0. The resinous coated panels were immersed in this rinse solution for the times indicated in Table 2 below. The rinse solution was at room temperature. After being withdrawn from the rinse solution the panels were baked as indicated hereinabove. The appearances of the baked coatings were noted and the coated panels were then subjected to the salt spray test for 144 hrs. Example No. 7 is set forth for comparative purposes.

TABLE 2

| Example number: | Time of Immersion | Scribe failure, inch | Appearance of Coating |
|---|---|---|---|
| 7 | Not rinsed | 3/32 | Glossy, textured. |
| 8 | 15 secs | 5/32 | Very slightly matted. |
| 9 | 30 secs | 1/8 | Slightly matted. |
| 10 | 1 min | 1/16 | Very matted. |
| 11 | 3 min | 0 | Do. |

From Table 2 above it can be seen that the longer the time of immersion of resinous coated panels in the Cr rinse solution, the better the corrosion resistant properties and the duller the appearance of the coating.

The next group of examples shows the results that were obtained when resinous coated panels were subjected to an aqueous Cr rinse solution at varying temperatures. The same rinse solution and same procedure as set forth in connection with Examples 7 to 11 above were used except that each of the resinous coated panels was immersed in the Cr rinse solution for 30 seconds and the temperature of the rinse solution was varied as indicated in Table 3 below. Example No. 12 is set forth for comparative purposes.

TABLE 3

| Example number: | Temp. of rinse solution, °F. | Scribe failure, inch | Appearance of coating |
|---|---|---|---|
| 12 | (1) | 1/4–5/32 | Glossy. |
| 13 | 100 | 3/16–1/32 | Matted. |
| 14 | 125 | 1/8–1/16 | Do. |
| 15 | 150 | 3/32–0 | Do. |
| 16 | 175 | 1/32–0 | Do. |

[1] Not rinsed.

As can be seen from the examples of Table 3 above, increased corrosion resistance can be achieved by increasing the temperature of the Cr rinse solution. The matted appearance of the coatings became more pronounced as the temperature of the rinse solution was increased.

The next group of examples shows the results that were obtained with respect to corrosion resistance when resinous coated panels were immersed in aqueous Cr rinse solutions having different $Cr^{+6}$/reduced Cr molar ratios as indicated in Table 4 below. There is set forth also in Table 4 the salt spray test results that were obtained utilizing a chromium rinse solution containing only hexavalent Cr; this aqueous solution was prepared from $CrO_3$. The resinous coated panels were immersed in the rinse solutions for 30 seconds; the solutions were at room temperature. The rinsed panels were then baked and were thereafter subjected to the salt spray test for 100 hrs.

TABLE 4

| Example number: | Molar ratio, $Cr^{+6}$/reduced Cr | Total Cr conc., g./l. | Scribe failure, inch |
|---|---|---|---|
| 17 | 16.00 | 2.06 | 1/64–0 |
| 18 | 2.42 | 3.49 | 0 |
| 19 | 1.00 | 2.06 | 0 |
| 20 | 0.80 | 2.06 | 0 |
| 21 | (1) | 2.06 | 0 |

[1] $Cr^{+6}$ only.

The excellent corrosion resistance of the rinsed coated panels of the examples of Table 4 is self-evident. Except for the coated panel of Example No. 19, which was very matted in appearance, the coatings of the other panels remained glossy.

The next group of examples shows the results that were obtained with respect to corrosion resistance and surface appearance of resinous coated panels when the panels were immersed in an aqueous Cr rinse solution, the pH of which was varied. The total Cr concentration in the rinse solution was 3.6 g./l. and the $Cr^{+6}$/reduced Cr molar ration was 16. The pH of the starting solution was 1.25. After a coated panel was rinsed with this solution, the pH was increased as indicated in Table 5 below by the addition thereto of 40 wt. percent NaOH solution. The coated panels were immersed in the rinse solution for 30 seconds; the solution was at room temperature. After baking the coated panels, the appearances of the coatings were noted and they were then subjected to the salt spray test for 100 hrs. Example No. 22 is set forth for comparative purposes.

TABLE 5

| Example number: | pH of rinse solution | Scribe failure, inch | Appearance of coating |
|---|---|---|---|
| 22 | (1) | 1/8 | Glossy. |
| 23 | 1.25 | 0 | Matted. |
| 24 | 3.30 | 1/4–1/8 | Slight gloss. |
| 25 | 4.96 | >1 | Do. |
| 26 | 8.00 | 1/4 | Do. |
| 27 | 11.00 | 5/16 | Do. |

[1] Not rinsed.

The next two examples are illustrative of additional embodiments of the present invention.

EXAMPLE 28

A steel panel was immersed in an aqueous coating composition containing 50 g./l. of acrylic resin (Catalin A-1316 latex), 2 g./l. of fluoride, and 1.5 g./l. of hydrogen peroxide for 3 minutes. Upon withdrawal from the composition the coated panel was rinsed with an aqueous solution containing hexavalent chromium and reduced chromium which was prepared according to the method described in aforementioned Pat. No. 3,063,877. The concentrations of the hexavalent and the reduced chromium were each about 0.5 g./l. (expressed as $CrO_3$). The coated panel was treated for 30 seconds with the rinse composition which had a temperature of 130° F. After the rinsing step was completed, the coated panel was baked to complete fusion of the coating.

EXAMPLE 29

A steel panel was treated in the same manner as set forth in Example 28 above, except that the rinse composition used in this example contained polyacrylic acids in addition to hexavalent chromium and reduced chromium. (This type of composition is disclosed in U.S. Pat. No. 3,185,596 to Schiffman.) The rinse composition contained 10 g./l. of $Cr^{+6}$ and a like amount of reduced chromium (expressed as $CrO_3$) and 4.1 g./l. of polyacrylic acids (source—Acrysol-A-1, a solution of water soluble polyacrylic acids).

After each of the panels of Examples 28 and 29 above was rinsed, they were subjected to a salt spray test (ASTM B-117-61). Another steel panel, which was coated and baked in the same way as those of Examples 28 and 29, but which was not rinsed, was subjected also to the salt spray test. The results of the salt spray tests showed that the rinsed panels had much better corrosion resistance properties than the unrinsed panel, with the panel of Example 28 outperforming slightly the panel of Example 29.

In addition to the resinous coatings described above in the aforementioned examples, resinous coatings of the examples set forth in the aforementioned applications Ser. Nos. 791,762 and 791,801 now Pat. Nos. 3,592,699 and 3,585,084, respectively (incorporated herein by reference) can be rinsed with aqueous Cr rinse solutions as described herein.

In summary, it can be said that the present invention can be used to improve the corrosion resistance of resinous coatings deposited on metallic surfaces. In addition resinous coatings which have high gloss which tends to emphasize the texture of the surface can be modified to appear matted or lusterless according to the present invention thereby improving the appearance of the coatings.

What is claimed is:

1. A method for forming a corrosion resistant resinous coating on a ferriferous or zinciferous surface comprising: immersing the surface in an aqueous composition comprising, in coating-forming amounts:
    (A) about 5 g./l. to about 550 g./l. of resin solids dispersed in the composition, the source of the resin being a latex thereof;
    (B) about 0.4 g./l. to about 5 g./l. of fluoride ion;
    (C) an oxidizing agent selected from the class consisting of $H_2O_2$ and dichromate, said agent being present in an amount sufficient to provide from about 0.01 to about 0.2 of oxidizing equivalent per liter of composition; and
    (D) hydrogen ion in an amount sufficient to impart a pH of about 1.6 to about 3.8 to the composition;
wherein the amount of coating formed on said surface increases during at least a portion of the time the surface is immersed in said composition and wherein said coating is initially adherent and resists being removed from the surface when it is rinsed after it is withdrawn from the composition; withdrawing the resinous coated surface from the composition and rinsing said resinous coated surface with an acidic aqueous rinse solution containing (a) hexavalent chromium or (b) hexavalent chromium and formaldehyde-reduced forms of hexavalent chromium wherein the amount of chromium in said rinse solution is at least sufficient to improve the corrosion resistant properties of the resinous coated surface.

2. A method according to claim 1 wherein said surface is a ferriferous surface.

3. A method according to claim 2 wherein said chromium is present in an amount of at least about 0.1 g./l.

4. A method according to claim 3 wherein said chromium is present in an amount of at least about 0.25 g./l.

5. A method according to claim 2 wherein said resinous coated surface has a glossy appearance and wherein said chromium is present in said rinse solution in an amount at least sufficient to reduce the gloss of said surface.

6. A method according to claim 5 wherein said rinse solution is (a) of claim 1 and wherein the amount of hexavalent chromium is at least about 3 g./l. per liter.

7. A method according to claim 5 wherein said rinse solution is (b) of claim 1 and wherein the total amount of chromium is at least about 4 g./l.

8. A method according to claim 5 wherein said rinse solution is (b) of claim 1, wherein the molar ratio of hexavalent chromium/reduced chromium is about 1 and wherein the total amount of chromium is at least about 0.5 g./l.

9. A method according to claim 1 wherein the pH of said rinse solution is less than about 3.30.

10. A method according to claim 7 wherein said rinse solution includes also about 2.5 g./l. to about 50 g./l. of polyacrylic acid.

References Cited
UNITED STATES PATENTS

| | | | |
|---|---|---|---|
| 3,185,596 | 5/1965 | Schiffman | 148—6.16 |
| 3,647,567 | 3/1972 | Schweri | 148—6.2 X |
| 3,585,084 | 6/1971 | Steinbrecher et al. | 117—132 C X |
| 3,592,699 | 7/1971 | Steinbrecher et al. | 148—6.2 |
| 2,296,070 | 9/1942 | Thompson et al. | 148—6.2 X |
| 3,063,877 | 11/1962 | Schiffman | 148—62. X |

RALPH KENDALL, Primary Examiner

U.S. Cl. X.R.

111—132 C, 62

UNITED STATES PATENT OFFICE
CERTIFICATE OF CORRECTION

Patent No. 3,795,546  Dated March 5, 1974

Inventor(s) Wilbur S. Hall and Lester Steinbrecher

It is certified that error appears in the above-identified patent and that said Letters Patent are hereby corrected as shown below:

Column 1, line 71, "ringing" should read --rinsing--.

Column 3, line 8, "mated" should read --matted--.

Column 3, line 40, after "latex;", read --Catalin 1464, an acrylic copolymer latex--.

Column 4, line 49, parenthesis --)-- at end of line should be deleted.

Column 11, line 17, "resitsance" should read --resistance--.

Signed and sealed this 2nd day of July 1974.

(SEAL)
Attest:

EDWARD M. FLETCHER, JR.
Attesting Officer

C. MARSHALL DANN
Commissioner of Patents